June 4, 1946.  R. S. CURRY, JR  2,401,337

CONTROLLING MEANS FOR GYRO INSTRUMENTS

Filed Aug. 15, 1942

INVENTOR
R. S. CURRY, JR.
BY Herbert H. Thompson
his ATTORNEY

Patented June 4, 1946

2,401,337

UNITED STATES PATENT OFFICE 2,401,337

CONTROLLING MEANS FOR GYRO INSTRUMENTS

Robert S. Curry, Jr., Baldwin, N. Y., assignor to Sperry Gyroscope Company, Inc., Brooklyn, N. Y., a corporation of New York Application August 15, 1942, Serial No. 455,007

8 Claims. (Cl. 74—5)

This invention relates generally to gyro instruments and particularly concerns a novel means for controlling a device operable to exert a turning moment about one of the axes of support of the rotor bearing case of such an instrument. In the embodiment of the invention illustratively depicted in the accompanying drawing, a directional gyro instrument is employed having a torque motor operable to exert a turning moment about the vertical axis of the instrument. Consequently the torque motor of the present invention may be used with an electrical signal producing, tilt responsive device as a means for correcting tilt of the rotor bearing case of a gyro instrument from a normal position.

One of the features of the invention resides in utilizing the output of a secondary winding which is movable in response to tilt of the rotor bearing case to selectively energize the torque exerting device.

Another feature of the invention consists in a reversibly wound primary coil element in the instrument which cooperates with the member to form the novel controlling means.

Other features and structural details of the invention will be apparent from the following description when read in connection with the accompanying drawing, wherein Fig. 1 is a side elevation of a gyro instrument constructed in accordance with the present invention with the outer casing thereof shown in section.

Figure 1:
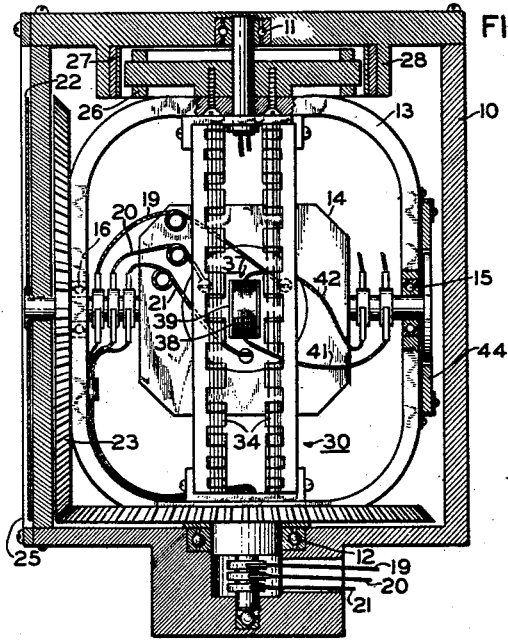

With reference to Fig. 1, the gyro instrument utilized in connection with the present inventive subject matter is shown to include an outer casing 10 having upper and lower bearings therein, as respectively indicated at 11 and 12, by which a conventional ring 13 is mounted for movement about a vertical axis. The gyro rotor bearing case or frame 14 of the instrument is pivotally mounted in the usual fashion between the upwardly extending arms of the ring by means of bearings 15 and 16 which support the case for movement about a horizontal axis. The gyro rotor (not shown) is mounted to spin within the rotor bearing case 14 on a normally horizontal axis perpendicular to both the axis of the case and the axis of the ring. The rotor bearing case of the gyro instrument is consequently bi-axially supported and is free to move about either of its mutually perpendicular axes. Any suitable means may be provided to spin the gyro rotor, such as an electric motor (not shown) whose stator windings 17 are supplied with three phase alternating current energy from a source 18 by way of leads 19, 20 and 21, Fig. 4. An azimuth heading indication is obtained from the described type of gyro instrument by a compass card 22 which is mounted for rotation from within the casing 10. Compass card 22 is shown as turned by vertical ring 13 by means of meshing bevel gears 23 and 24. A suitable lubber line (not shown) may be provided on the surface of the window 25 of the instrument for comparison with the indicating face of the compass card by the observer in determining the indication given by the instrument. This conventional type of free gyro instrument may be converted to an instrument having north seeking properties by slaving the same to a magnetic compass in a manner well known in the art.

Figures 4, 8:
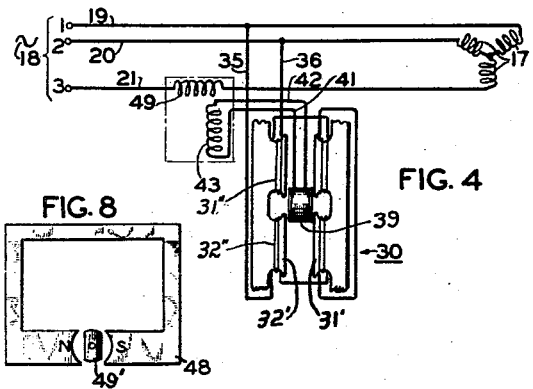
Fig. 4 is a wiring diagram and schematic view showing the electrical connections employed in the present instance for the cooperatively functioning controller and torque exerting device.
Fig. 8 is a detail view similar to Figs. 5 and 6 in which a further modification of the magnetic couple for counteracting the reactive effect of secondary member in the gyro instrument.

In the form of the invention shown in the drawing, the torque applying device employed is a polyphase wound motor whose stator 26 is fixedly mounted upon the vertical ring 13. The conventional motor shown is of the squirrel cage induction type, the rotor 27 being annular in shape and including a plurality of spaced conducting bars therein which are electrically connected in a suitable manner. The rotor 27 is fixedly mounted on a flange 28 which extends inwardly from the top of the casing 10. As shown, the device or motor is operable to exert a turning moment about one of the axes of support of the case 14 within the casing 10 and in the present instance such axis is the axis of the vertical ring 13. The stator of the motor is polyphase wound and as shown in Fig. 4, one of the windings of the motor such as indicated at 49 may be continuously energized by inclusion in the circuit leads between 21 and 19—20 by which alternating current energy is supplied from the source 18 to the stator winding 17 of the motor employed to spin the gyro rotor.

Figure 2:
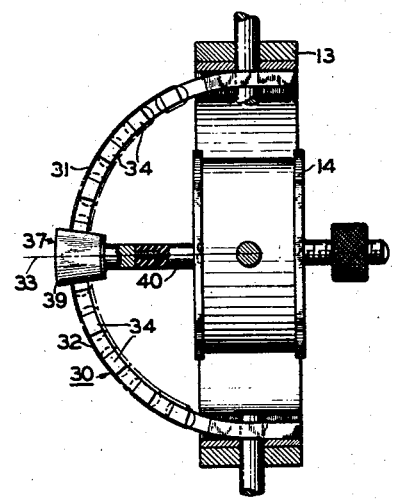
Fig. 2 is a detail side elevation further showing one form of the parts of the improved controller and the relation of the same to the vertical ring and rotor bearing case of the gyro instrument.

The controlling means for the torque motor constructed in accordance with the teaching of the present invention consists of two relatively movable parts, one of which is termed a primary coil element and is designated generally at 30. This element is a stator which in the instance shown is annular or semi-circular in form and is connected at its respective ends to vertical ring 13. The stator is considered as divided into two sections 31 and 32, one of which is located above the horizontal line 33, Fig. 2, and the other of which is located below the line. Oppositely disposed portions of the stator include a plurality of spaced pole pieces 34 across which the field flux of the element moves. The pole pieces 34 in section 31 and section 32 are wound in reverse relation, as diagrammatically shown in Fig. 4 at 31″ and 32″. The windings of the primary coil element may also be included in the energy supplying circuit provided by leads 19, 20 and 21, leads 35 and 36 as shown in Fig. 4 being utilized for this purpose.

The other part of the controlling means is provided by a secondary coil member designated generally at 37 which includes a spool mounted winding 38 that is movable responsive to tilt of the case 14 about the other of the axes of support of the same or, as shown, the horizontal axis of the case, to a position in which the winding is in the path of the field flux of either one of the primary element sections. The spool mounting for the secondary winding member is indicated at 39, the same being fixed on an arm 40 which extends from the side of the rotor bearing case 14, Fig. 2. In utilizing the novel controlling means in the present instance, the output of the secondary winding member is supplied to selectively energize the other of the windings of the torque motor by way of leads 41 and 42. The other winding of the torque motor is indicated at 43 in Fig. 4.

Figure 3:
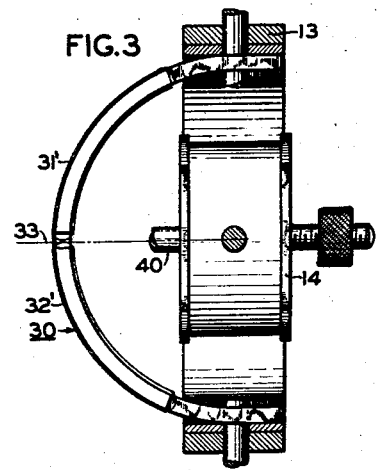
Fig. 3 is a view similar to Fig. 2 illustrating a modified form of the primary coil element of the controller.

In the modification of the invention shown in Fig. 3, the stator of the primary element is constructed to include only four curved pole faces, two of which are indicated at 31′ and 32′. In a gyro instrument where a large precessional force is required, an amplifier may be inserted between the pick-up secondary coil member and the selectively controlled winding 43 of the torque motor.

Figures 5, 6:
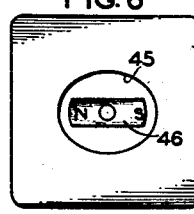
Fig. 5 is a detail front elevation of a force counter-balancing means which may be employed in connection with the present invention.
Fig. 6 is a view similar to Fig. 5 showing a modified form of the counter-balancing means illustrated.

Means are also provided to counterbalance any tendency of the control means against exerting a coercive force about the axis of the case 14 which may result in precessional movement of the vertical ring. This tendency arises in the present instance because of the fact that as the case tilts from a normal position and directive energy is induced in the winding of the secondary member a reactive force is electrically produced which tends to oppose movement of the member. As shown, such counterbalancing means is a variable reluctance magnetic couple consisting of a magnetic permeable core 44, Figs. 5 and 6, which is fixed to the side of the vertical ring 13 and includes a central elliptical opening 45. A bar shaped permanent magnet or disc-shaped magnet (as respectively indicated at 46 and 47 in Figs. 6 and 5) is fixedly mounted on an extension of one of the trunnions supporting the rotor bearing case 14. Normally the magnets extend along the major axis of the elliptical opening in the core so that the reluctance in the magnetic circuit provided by the parts is a maximum. As tilt of the case occurs, the magnets 46 or 47 are progressively moved correspondingly to a position lowering the reluctance in the magnetic circuit. In this manner a decentralizing torque is produced about the axis of the case which opposes or counterbalances the reactive centralizing torque produced on the secondary member and the consequent disturbing effect of the same on the gyro instrument.

In Fig. 8, the counteracting magnetic couple is shown to include a fixedly mounted horse-shoe type magnet 48 and a magnetically permeable core 49′ which in this event is mounted to move towards the pole faces of the magnet when the gyro rotor case tilts from a normal position. The secondary member of the controller acts as a pick-off which produces a signal upon tilt of the case from a normal position about one of its axes. The reactive effect of the pick-off or secondary member on the gyro instrument is counteracted by the torque exerted by one of the disclosed forms of magnetic coupling.

Figure 7:
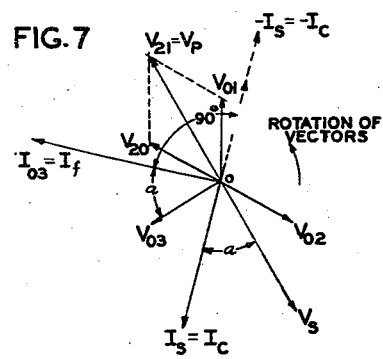
Fig. 7 is a vector diagram showing the phase relations of the current in the torque motor employed in the present instance to exert the turning moment about the desired axis of the gyro instrument.

It will be understood that the selectivity of the controller results from the fact that the phase of the voltage induced in the secondary member is reversible and is determined by the position of the secondary winding with respect to the primary coil element. A vector diagram of an instantaneous voltage current relationship in the respective windings of the torque motor in the electrical arrangement of the parts shown in Fig. 4 is indicated in Fig. 7. In this figure the 120° displaced voltage vectors $V_{01}$, $V_{02}$ and $V_{03}$ are representative of the respective line voltages in lines 1, 2 and 3, or leads 19, 20 and 21. The voltage vectors $V_{01}$ and $V_{20}$ at the instant chosen are vectorially combined to obtain the resultant voltage vector $V_{21}$ which is the same as the vector $V_p$ representative of the voltage supplied the primary coil element of the control means. The corresponding voltage vector $V_s$ of the secondary coil member is shown as 180° phase displaced from that of the primary coil element. The current voltage vector $V_s$ of the secondary coil member is shown as 180° phase displaced from that of the primary coil element. The current vector $I_s$ of the secondary coil member or $I_c$ of the winding 43 is shown as lagging the voltage vector by the phase angle $a$ which is determined by the resistance and inductance constants of the circuit. The torque motor winding 49 is energized through line 3 or lead 21, and the current vector $I_{03}$ for the line or $I_r$ for the winding lags the vector $V_{03}$ by the controlled phase angle $a$. Vectors $I_r$ and $I_c$ and consequently the resultant flux fields of the windings 29 and 43 are illustrated disposed in substantially 90° displacement. The negative current vectors for the control field winding 43 of the torque motor are indicated in the diagram at $-I_s$ or $-I_c$.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a gyro instrument having a rotor frame mounted with freedom about two mutually perpendicular axes, a pick-off member producing a signal upon displacement of the frame from a normal position about one of its axes and having a reactive effect on the gyro instrument, and a magnetic couple for exerting a torque about the axis of the pick-off member to counteract the reactive effect of the pick-off member on the instrument.

2. In a gyro instrument having a rotor frame mounted with freedom about two mutually perpendicular axes, means for exerting a torque about one of the axes of the frame, a pick-off member responsive to tilt of the frame about the other of its axis for controlling operation of said torque exerting means, said pick-off member having a reactive effect on the gyro instrument, and a magnetic couple for exerting a torque about the axis of the pick-off member to counteract the reactive effect of the pick-off member on the instrument.

3. A gyro instrument as claimed in claim 1, in which the magnetic couple comprises a permanent magnet mounted for movement responsive to tilt of the frame and a fixedly mounted magnetically permeable core having an elliptical opening therein in which said magnet moves.

4. Means for reducing deviation of a gyroscope due to resistance to precessional movements about an axis, comprising a permanent magnet and a flux conducting member adjacent thereto, one of which is mounted to turn with the gyroscope about said axis and the other of which is fixed with respect thereto, the air gap between said conducting member and magnet changing with relative movement therebetween to render the same effective to exert a decentralizing force on the gyroscope.

5. In a gyroscopic instrument having a rotor bearing frame, a casing, a ring supporting the frame for movement relative to the casing about two mutually perpendicular axes and electrical means for exerting a torque about one of the axes of the frame having a winding mounted on the ring; a coil connected to directly supply energy to the winding of the torque exerting means mounted on the frame to move in a defined path about the second of the axes thereof, a wound stator mounted on the ring producing two magnetic fields along the path of movement of said coil that flow in opposite directions from a zone in said path, and means for energizing said stator, said coil being normally positioned in said zone in which it links both fields of the stator equally to provide a zero output and being movable in its entirety to be linked by one or the other of the fields alone to provide an output whose phase sense depends on the direction of movement of the coil from its normal position and whose amplitude is sufficient to operate the torque exerting means.

6. A gyroscopic instrument as claimed in claim 5, including means for counterbalancing the coercive force produced on the frame when the coil provides an output.

7. A gyroscopic instrument as claimed in claim 5, in which said wound stator includes a plurality of pole pieces in mutually facing relation situated on opposite sides of said coil and extending substantially parallel to the axis of the frame about which the coil is mounted to move.

8. A gyroscopic instrument as claimed in claim 5, in which said torque exerting means is a polyphase wound motor one of whose windings is directly energized by the output of said coil.

ROBERT S. CURRY, Jr.